United States Patent [19]

Brown

[11] Patent Number: 4,884,860
[45] Date of Patent: Dec. 5, 1989

[54] LINEAR LENS AND METHOD FOR CONCENTRATING RADIANT ENERGY AND MULTIPLYING PHOSPHOR LUMINANCE OUTPUT INTENSITY

[76] Inventor: David C. Brown, 4751 State Rt. 34, Winfield, W. Va. 25213

[21] Appl. No.: 162,829

[22] Filed: Mar. 2, 1988

Related U.S. Application Data

[63] Continuation-in-part of Ser. No. 826,304, Feb. 5, 1986, Pat. No. 4,733,929, and Ser. No. 849,055, Apr. 4, 1986, Pat. No. 4,799,748.

[51] Int. Cl.⁴ .................................................. F24J 2/48
[52] U.S. Cl. .................................. 350/96.15; 126/441; 136/247; 350/96.10; 350/96.29; 350/96.34; 350/409; 362/32
[58] Field of Search ............... 350/96.10, 96.15, 96.29, 350/96.30, 96.31, 96.33, 96.34, 320, 409, 417, 432, 433; 362/32; 250/227, 461.1, 486.1, 487.1; 252/301.16, 301.33; 126/441; 136/247

[56] References Cited

U.S. PATENT DOCUMENTS

| | | | |
|---|---|---|---|
| 3,005,103 | 10/1961 | Hinson | 250/487.1 |
| 3,253,146 | 5/1966 | De Vries | 250/487.1 |
| 3,908,055 | 9/1975 | Susuki et al. | 428/67 |
| 4,208,300 | 6/1980 | Gravisse | 252/301.33 |
| 4,227,939 | 10/1980 | Zewail et al. | 136/247 |
| 4,425,907 | 1/1984 | Younghouse | 126/439 |
| 4,452,720 | 6/1984 | Harada et al. | 252/301.16 |
| 4,560,286 | 12/1985 | Wickersheim | 250/461.1 X |
| 4,569,570 | 2/1986 | BrogÅrdh et al. | 350/96.34 |
| 4,626,068 | 12/1986 | Caldwell | 350/96.34 |
| 4,650,992 | 3/1987 | Ruhrmann | 250/227 |
| 4,733,929 | 3/1988 | Brown | 350/96.15 |
| 4,799,748 | 1/1989 | Brown | 350/96.10 |

*Primary Examiner*—John D. Lee
*Attorney, Agent, or Firm*—Jim Zegeer

[57] ABSTRACT

A luminescent fiber marker and method comprised of a linear coaxial lens having an elongated thin cylindrical phosphorescent layer and a pair of colinear and coaxial optical waveguides sandwiching the thin cylindrical phosphorescent layer therebetween so that light impinging on said cylindrical phosphorescent layer along the length thereof is induced to store said radiation energy in said light and emit radiation of a different wave length from the light impinging on said cylindrical phosphorescent layer into both of said optical waveguides. Each of said optical waveguides has a fluorescent material dispersed therein for absorbing the emitted radiation from said phosphorescent layer reemitting the absorbed radiation to effect an internal scatter of radiation in each of said waveguides to permit trapping within the waveguide cores. At least one of the ends of the pair of colinear and coaxial waveguides is adapted to emit said light of a different wave length, the ends may be arranged in various patterns and/or have diffusers or mirrors associated therewith.

43 Claims, 4 Drawing Sheets

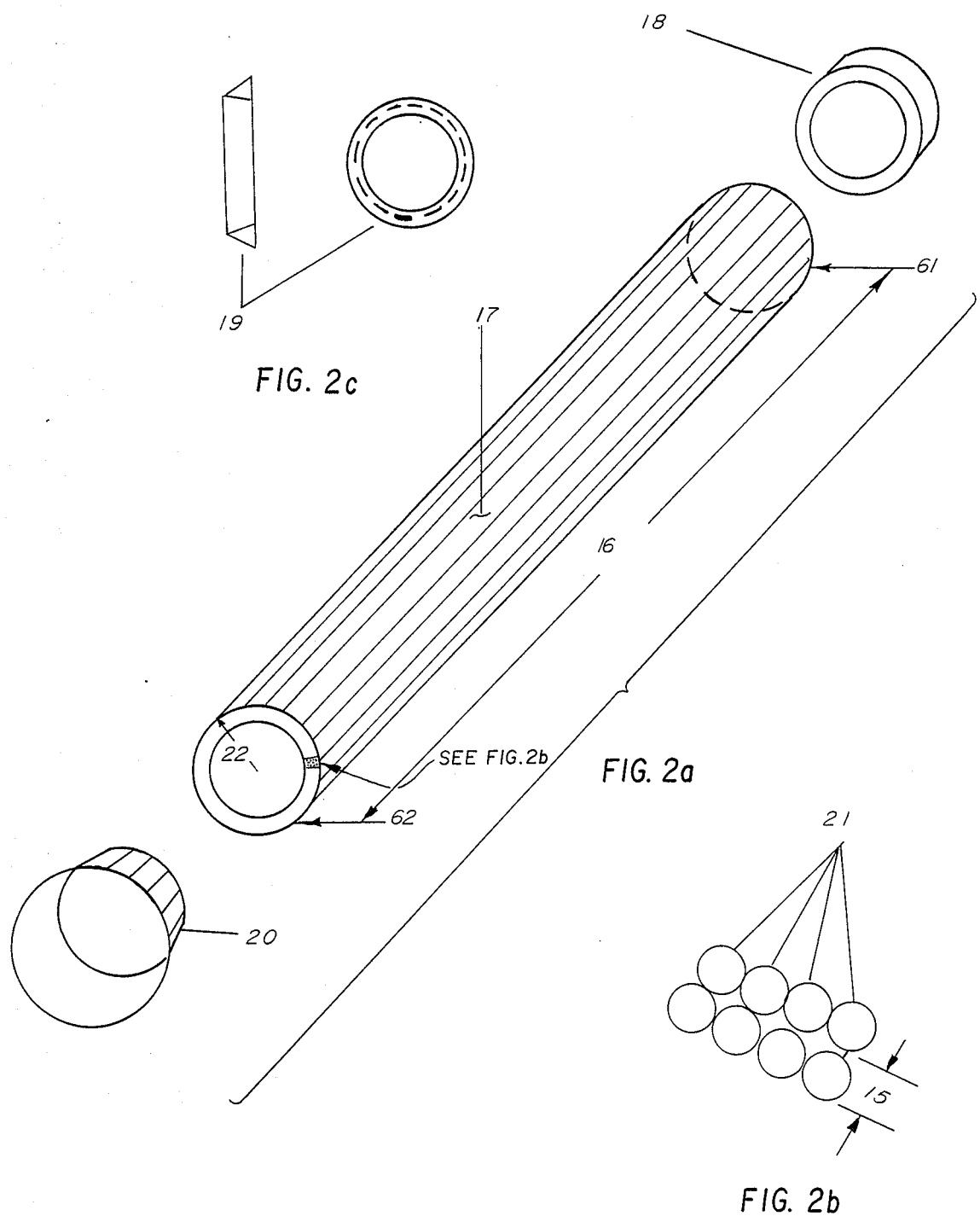

LINEAR LENS AND METHOD FOR CONCENTRATING RADIANT ENERGY AND MULTIPLYING PHOSPHOR LUMINANCE OUTPUT INTENSITY

REFERENCE TO RELATED APPLICATIONS

This application is a continuation in part of my application Ser. No. 826,304 filed Feb. 5, 1986 and my application Ser. No. 849,055 filed Apr. 4, 1986, both of which are incorporated herein by reference.

BACKGROUND OF THE INVENTION

1. Field of the Invention

This invention relates to a device which uses refractive and fluorescence means to intensify, (1) photophosphorescence in a fiber marker with luminescent properties for use in marking systems and (2) fluorescence to create an emissions detector for laser or light dispersion flux fields.

2. Description of the Prior Art

The prior art using material with photophosphorescence to create luminescent markers has involved incorporating a phosphor in a synthetic resin such as polyethylene (Susuke—3,908,055) to form tiles, plates and spheres for use as inserts to form a luminous marker. This method of using phosphors for luminescent markers has the disadvantage of being inefficient use of the phosphor.

The method common to the trade of making material for luminescence markers by incorporating a phosphor in a binder and forming this luminous material into shapes, such as titles, plates and spheres, is not an effective use of the phosphor. An example of this method is the use of a calcium sulfide phosphor in a polyethylene binder to make a resin composite. Inserts made of this resin composite, in the form of tiles, are used to create a luminous road marker by embedding the tile in or to the pavement, The advantage noted in the prior art is that it provides continuous luminous action through the exposing of new luminescence material as the marker abrades. However this method is not effective and is a disadvantage because phosphors are very detrimentally affected by moisture, salts and acids normally associated with weathering.

What occurs on the surface of this type of luminescence marker, on exposure to weather, is the loss by errosion of the phosphor particles in direct contact with the surface. The depth of moisture penetration into the luminescence marker will depend on the permeability of the binder resin used and how effective the individual phosphor particles are encapsulated within the binder. Interconnection between the phosphor particles will promote deep penetration of moisture through capillary action.

The moisture creates an opaque screen of inactivated phosphor particles between the marker surface and the underlying effective phosphor particles. This opaque screen is a boundary condition resulting from the direct exposure of the phosphor-resin composite to weather. The abrading of the surface will only result in the consumption of the marker and the inward movement of the opaque screen.

The phosphor inefficiency arise from the interference in the transmission of photons across the boundary between the phosphor molecules in the luminescence marker and the exposed marker surface. For photophosphorescence to occur, the phosphor molecule must be excited by visible or invisible light, a photon. After a delay, the phosphor molecule emits a photon at a longer wave length than the exciting photon. Obviously the emitted photon must be in the visible light region of the electromagnetic spectrum to be useful as a marker to the public. Therefore, the material between the emitting phosphor molecule and the surface of the marker must be translucent to permit the passage of light. The interference with the transmission of the exciting and emitting light to and from the active phosphor particles by the opaque screen of weathered material in exposed phosphor-resin composite inserts is one cause resulting in the ineffective use of the phosphor in markers of this type.

Interference to the transmission of the excitation energy and the luminescence is also created by the active phosphor particles which are opaque. The prior art has attempted to minimize the loss of translucency due to the opaque nature of the phosphor particles by using a transparent binder. One prior art method is the form a suspension of phosphor particles in a clear acrylic ester resin deposited on supporting sheets. (Hinson 3,005,103). Another prior art method is the use of small spheres coated with a phosphorescent material to activate fluorescent pigments in a transparent binder to provide a reflective colored return at night. (de Verieres—3,253,146) (Gravisse—4,208,300).

Use of a clear binder to suspend the phosphor over a reflective film, or as phosphor coated spheres in a transparent binder, is the current commercial method of minimizing the opaque effect of phosphor. The method is to arrange the phosphor particles in a suspension to provide light pathways that enhance the return of the emitted light by clear binders and reflective backing film. Older methods simply maximize the amount of phosphor particles in the exposed surface.

In both approaches, the net effective emission surface is approximately half the surface receiving the excitation energy. To illustrate, consider a perfect uniform layer of phosphor one molecule thick on a horizontal plane being bombarded from overhead by photons that supply the excitation energy. The direction of the emission photons will be completely random, with the result half the emitted photons will travel below the horizontal plane, and half the emitted photons will emerge above the plane. The photons emerging below the plane can be directed by reflection back through spaces in the phosphor layer, but not through the phosphor molecules because of the opaque characteristic of the phosphor. The limiting effect in the production of lumination arises as more passageways are created to permit the return of the backscatter photons emitted below the plane, less phosphor molecules are available to generate the photons being reflected. Therefore, current commercial luminescent markers have the disadvantage of either losing half the emitted light to internal absorption by the marker body, or only capturing part of the excitation energy because of the need for creating voids in the phosphor surface to allow passage of the reflected light back in the direction of the marker surface.

Another disadvantage of prior art is the lack of mechanism to intensify the photophosphorsence lumination. Note that in this invention, phosphorescence is used to denote photons emitted by a molecule's electron return from a triplet state to the ground state. In general, photophosphoresence is delayed light emission associated with a change in electron spin. Fluorescence is the photon emitted by a molecule's electron return to the ground state from the singlet state.

Phosphorescence lumination is characterized by very low light intensities. For example, a zinc sulphide phosphor luminance one minute after excitation is 0.17 candles/m²(c/m²) and 0.001 c/m² after 30 minutes. For comparison, the luminance from a clear sky is approximately 3200 c/m² and from white paper in moonlight is 0.03 c/m². The prior art has no provisions for increasing the intensity of the phosphor luminance which results in photophosphorescence markers being useful primarily in night adapted vision situations.

Laser emission is characterized by a small diameter intense beam of photons with the same wavelength. The intensity of the laser beam makes detection a simple technical matter using a photoelectric detector cell based on amorphous silicon, monocrystal silicon or gallium-arsenic. However, the small cross-sectional area of the laser beam would require many detectors to assure a reasonable probability of detecting a rogue laser beam. For example, a blue-green laser passing thru water near a submarine would likely never be detected using known methods of prior art, because in the known prior art, the photoelectric surface must be in direct contact with the laser beam and also protected from damage by the intense laser flux of photons. This required protection of the photoelectric surface of necessity reduces the detector's sensitivity to the faint flux of dispersion photons scattered by the water, or air as the laser beam travels through the media.

Obviously, the laser photons can excite a fluorescent material with an excitation band in which the laser emission wavelength falls. In my invention, a fluorescent material that the laser emission can cause to fluoresce is referred to by the symbol of LEF-Dye.

SUMMARY OF THE INVENTION

Accordingly, the primary general objects of my invention is to provide an improved linear lenses and luminescent marker which will eliminate the disadvantages of the prior art. The invention can best be visualized as a thin cylinder of photophosphorescent phosphor or a fluorescent dye [LEF-Dye], with an excitation band matched to the emission wavelength of the dispersion photon flux to be detected, within an optical waveguide and/or containing an optical waveguide. The optical clear waveguides contain a fluorescence material with an absorption spectrum matched to the photophosphorescent phosphor's or [LEF-Dye] emission spectrum. Fluorescence reemission at a longer wavelength of the absorbed phosphor's or [LEF-Dye] emission permits a fraction of the phosphor's or LEF-Dye emission energy to enter trapped modes within the waveguide. By successive internal reflection within the waveguide the phosphor's or LEF-Dye emission energy (photons) travel to the waveguide's edge.

One specific object is to eliminate the loss of the phosphor's emission photons by internal absorption in the phosphor layer. The phosphor layer thickness is restricted to that depth of phosphor molecules that allows the excitation energy to reach the bottom layer of phosphor molecules. The thinness of the phosphor layer permits the emission photons to exit either outward into the surrounding waveguide or inward into the contained waveguide.

Another specific object of my invention is to minimize blocking of the excitation and emission light by both an opaque screen of weathered phosphor-resin material and the phosphor cylinder. The optical clear cladding and waveguide core provide substantial protection to the phosphor layer from moisture and other weathering effects. The outer waveguide provides multiple path ways for the excitation energy to enter into an array of luminescent fiber markers. The incident excitation radiation is bent by the natural lens effect of the circular waveguide and refraction and reflection at the cladding and core interface of the waveguide. Fluorescence means can be added to the cladding material to aid scatter of the incident radiation energy into the phosphor layer. This scattering of the incident excitation radiation permits a number of stacked phosphor cylinders in an array to become excited.

Another object of my invention is to increase the surface of the active phosphor with respect to the area of the fiber marker. Obviously in the prior art, the maximum phosphor surface is the plate, tile or sphere's surface. By using a cylinder shape the phosphor surface becomes greater than the plane surface of the fiber marker. The ratio of the active phosphor surface to the plane area of the overall fiber marker is pi ($\pi$) times the sum of the inner phosphor cylinder radius and outer phosphor cylinder radius divided by the outer radius of the fiber. The phosphor layer has two emission surfaces, the outer and the inner, due to control of the phosphor layer depth with respect to the excitation energy. The ratio can range from 2 to 5, therefore a fiber marker will have an active phosphor surface 2 to 5 times greater than the plane area of the fiber marker. The ratio is termed [S] in this application.

The unique ability of a photophosphorescence phosphor to store certain electromagnetic radiation energy and release the stored energy as useful luminescent is essentially a surface event as noted in the description of prior art. One advantage of this invention is the multiplication of the active phosphor surface per unit of device's plane surface. An array of four layers of fiber markers will create an active phosphor surface of ten to sixteen times the exposed surface area of the stacked fiber markers. The flux of emission photons available from such an array with sufficient recharge time will be approximately ten to sixteen times the flux from current prior art methods for a given phosphor excitation energy and unit surface area.

Another object of my invention is to increase the intensity of the phosphor or LEF-Dye luminance. Circularily cylindric waveguides using fluorescence emission to rescatter the photons into trapped modes will capture 10 to 30 percent of the phosphor or LEF-Dye emission in the waveguide. The multiplication of the photon flux trapped in the waveguide is a cumulative linear process. For example, the area of phosphor or LEF-Dye surface contributing emission photons in the waveguide, per unit of waveguide length, is the ratio [S] of the phosphor or LEF-Dye surface to the plane area of the fiber marker and the trapping effectiveness of the waveguide. Using the marker fibers diameter as the unit of length and a phosphor/waveguide surface ratio [S] of 2.5, for an example, the phosphor surface area supplying emission photons is 2.5D*D/D. If 10 percent of the phosphor emission photons are successfully trapped within the inner and outer waveguide, the net area of phosphor surface per fiber diameter length, adding emission photons to the waveguide flux is $0.25D^2$. This is equivalent to a phosphor emission area equal to 25 percent the plane area of the fiber marker being concentrated in twice the area of the waveguide cross section; in effect a linear coaxial lens for the phosphor's emission surface. The double area is because the photons can travel in either direction after being scattered into a trapped mode, thereby two cross section areas. The ratio of the areas are the ratio [S]*(fiber outer diameter)*(fiber length) divided by two times the fibers overall cross section area. The symbols [*] denotes multiplication and [^] denotes exponentiation in this specification.

The ratio of emission surface to waveguide cross section shows that the multiplication of phosphor or LEF-Dye luminance is directly proportionate to the length, the trapping efficiency and inversely proportional to the waveguide diameter. The length is limited by transmission loss in the waveguide material and the device in which the invention is used. For example, a fiber marker in highway paint the length would be less than 1", and as a further example as a guide marker on a door the length could be several feet or hundreds of feet in an antenna. The diameter is limited by manufacturing technology with a current lower limit of approximately 10 mils. The trapping efficiency is a function of the refractive index ratio for the waveguide core and cladding material. Therefore the invention can be configured to multiply the phosphor or LEF-Dye luminance intensity several thousand times.

BRIEF DESCRIPTION OF THE DRAWING

FIG. 2a is an exposed perspective view of a four layer array of luminescent fiber markers wrapped into a cylinder shape with various end devices, FIG. 2b is an enlarged section of elements shown in FIG. 2a, and FIG. 2c shows a retro-reflector.

DESCRIPTION OF THE PREFERRED EMBODIMENT

Figure 1A:
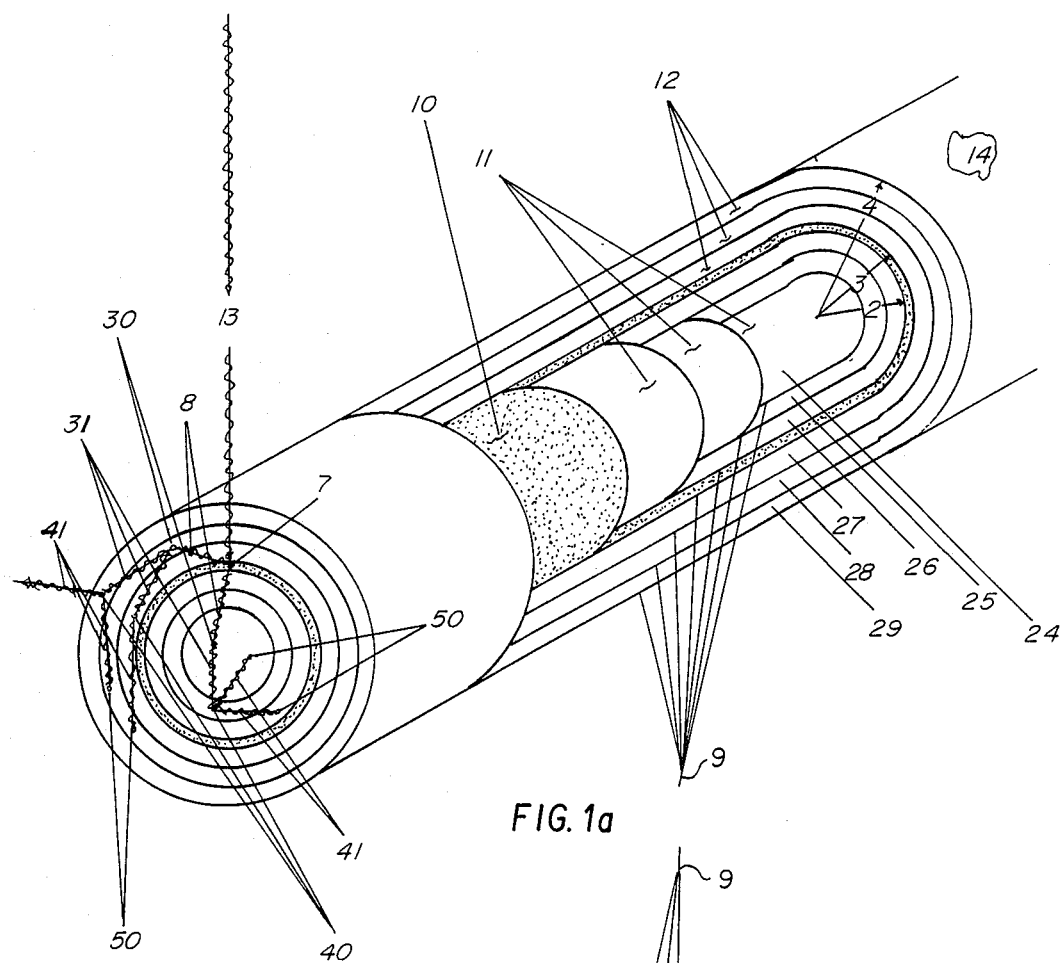
FIG. 1a is a partially sectional perspective view and FIG. 1b is a cross sectional view of a luminescent fiber marker incorporating the invention.
Figure 1B:
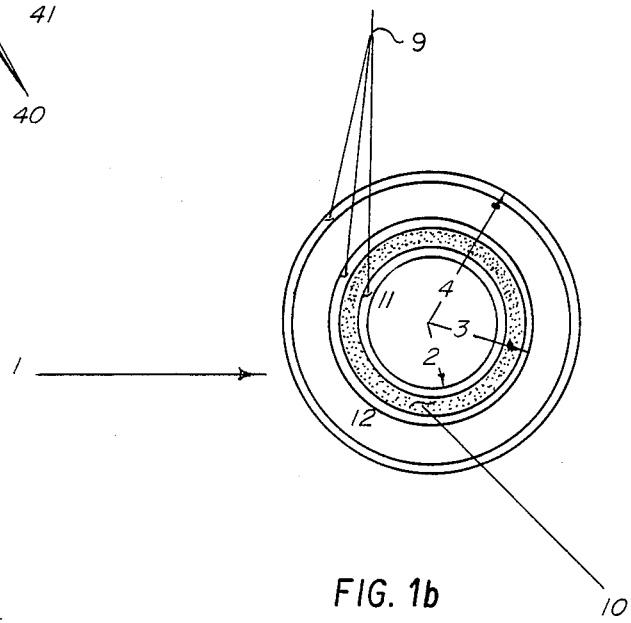

Referring now to FIG. 1, the luminescent fiber marker (14) is shown with the cylinder of phosphor (10) within an optical waveguide region (12) and containing an optical waveguide region (11). The inner (11) and outer (12) waveguide material may be the same, different or the same material with cladding layers (9) to create separate zones (24, 25, 26, 27, 28, 29); however, if different material is used, the material must have compatible physical and chemical properties.

The outer waveguide (12) is shown circular, but in an array can be a slab or plate type planer waveguide. The cladding layer (9) and outer waveguide region (12) on the outer surface of the phosphor cylinder (10) permits creating an array of phosphor cylinders containing inner waveguides within a slab type dielectric waveguide by providing pathways for the exciting incident radiation to reach the lower phosphor layers.

The material for the waveguides (11, 12) and cladding (9) is an optically clear material with respect to the incident radiation wave length (13) that provides the excitation energy to the phosphor (7), the photophosphorescence emission radiation wavelength (8) and the fluorescence reemission (31, 41, 51) from the contained fluorescent material (30, 40, 50) as shown in FIG. 1. The cladding will have a lower refractive index than the waveguide core material. The waveguide and cladding material may be a soda glass, crown glass, silica glass, dense barium flint glass, lanthanum flint glass, flint glass, acrylic polymer methylmethacrylate, polystyrene, polycarbonate, methylacrylate styrene copolymer, allyldiglysol carbonate, polymethylpentane, styrene acrylonibrile, fluorocarbon resin, FEP fluroplastic, polyvinylidene fluoride, polymethyl methacrylate fluorinated polymer, polymides, polyolefins, polysulfones, polysiloxones, cellulose acetates, polypropylene terephthalate, polyethylene terephthalate, polyethylene isophtalate, polyvinylidene chloride, or other suitable material that becomes commercially available and apparent to those skilled in the material art for performing the equivalent function.

The waveguide material contains a fluorescent substance (30) having the ability to absorb the emission radiation from the phosphor or LEF-Dye and re-emit (31) the absorbed light to effect an internal scatter of the radiation to permit trapping within the waveguide cores. The fluorescence is randomly re-emitted in all directions within the waveguide, with a fraction of the reemission photons having an angle of incidence to the waveguide-cladding interface, greater than Snell's law of reflection critical angle of incidence for the respective indexes of refraction for the waveguide core (11) and (12) and the cladding (9) material.

The ratio of trapped energy [RE] to the initial scattered energy is approximately $RE = 1 - ARCSIN$ (cladding index of refraction/core index of refraction) or $RE = 0.08$ to $0.25$. Commercially available plastic material will allow core-cladding combinations that can trap 0.08 to 0.13 of the fluorescence from an efficient fluorescent dye. High refractive index flint glass such as Schott SF 57 with terbium oxides as the fluorescent centers have a potential RE of 0.24.

Rare-earth oxides of samarium (sm202), eruopium (Eu203), and dysprosium (Dy203) combined with high index flint and soda glasses offer favorable excitation and emission spectra for fluorescent waveguides. Molycorp Application Report 7001 "THE USE OF RARE-EARTH OXIDES TO GIVE COLOR OR VISIBLE FLUORESCENCE TO SODA-LIME GLASSES" describes examples of fluorescence glass. The material is available from Molybdenum Corporation of America, 280 Park Ave. New York, New York 10017. Inorganic ions chromium, neodymium and itrium can also be used to create fluorescent centers in glass.

Polycarbonate or polymethylmethacrylate have lower refractive indexes than available flint glasses with a consequently lower ratio of trapped energy; however, a wide selection of organic fluorescent dyes are commercially available from Pylam Products Co., Sun Chemical Co., Allied Chemical, Shannon Luminous Material, Day Glo Corp., Radiant Color, Cleveland Pigment and Color Company, Uniform Color Company, Bayer and other commercial sources which offers a means of increasing the ratio of trapped phosphor emissions. Many fluorescent dyes have narrow absorption and emission bands widths of <50 nm separated by 60 to 100 nm that permit matching two, three or four progressively longer wavelength emission to absorption bands. Each fluorescence event allows 0.08 to 0.13 of the remaining untrapped emissions to be scattered into angles of incident permitting capture within the waveguide zone. This multiple fluorescent scattering cascade is cumulative and can trap 20 to 30 percent of the phosphor's emission photons.

TABLE 1

| MATERIAL | WAVE LENGTH RANGE IN nm | |
|---|---|---|
| | EXCITATION | EMISSION |
| Fluorescent | | |
| F-Dye #1 | 550 | 600 |
| F-Dye #2 | 480 | 550 |
| F-Dye #3 | <430 | 480 |
| Phosphor #1 | 300-500 | 550 |
| Phosphor #2 | <400 | 440 |

Table 1 list classes of material grouped by their excitation and emission spectra. Referring to Table 1 and FIG. 1, phosphor #2 (7) with emissions in the blue-violet (8) excites F-Dye #3 (30) in the middle zone (28) of the outer waveguide region (12) and the inner most zone (24) of the inner waveguide region (11). The F-Dye #3 emissions (31) excite F-Dye #2 (40) in the outer (29) and inner (27) zones of the outer waveguide region (12) and the middle (25) zone of the inner wave guide (11) region. This permits all of F-Dye #3 (30) untrapped emissions to pass through zones containing F-Dye #2 (40) and allow excitation of F-Dye #2.

F-Dye #1 (50) is added to the zones (24) and (28) containing F-Dye #3 (30) and the outer zone (26) of the inner waveguide region (11). This permits all of F-Dye #2 (40) untrapped emissions (41) in the inner waveguide region (11) to pass through zones containing F-Dye #1 and in the outer waveguide region (12) to pass through the zone (28) containing F-Dye #1.

F-Dye #3 must be separated from F-Dye #2 to prevent absorption and rescattering of trapped F-Dye #3 emissions by F-Dye #2, however, since F-Dye #1 excitation region is outside F-Dye #3 emission spectrum the two fluorescent dyes can share the same waveguide zone. Bands of cladding (9) are used to create the separation within the waveguide. The cladding is chosen from a material transparent to phosphor and fluorescent dyes emissions and with a lower refractive index than the waveguide core regions. The multiple separated fluorescence scattering events trap 20 to 30 percent of the phosphor emission energy. Clearly the same procedure can be used with high refractive index glass with fluorescent centers for even greater trapping efficiencies of the phosphor emissions by the waveguide.

The prior art uses the fluorescent dyes series in which the emission of the shorter wavelength dye is matched to the absorption band of the next longer wavelength fluorescent dye to increase the amount of solar energy captured in fluorescent waveguides. The dyes are either placed together in the waveguide [Zewail etal Patent 4,227,939] or placed in separate layers [Mauer etal Patent 4,149,902] optically bonded to form a composite waveguide. The patents are cited for reference to illustrate the essential difference between maximizing the capture of a phosphor or LEF-Dye emission used by the invention and the method prior art uses to maximize the capture of the solar flux.

The photon cascade involving two to more fluorescent dyes absorbs more of the solar flux than one dye can due to the wavelength specific nature of a fluorescent dye and the fact the solar flux has many wavelengths present. Energy emission from the shorter wavelength (F-Dye #3, for example) or first dye in the cascade event, is shifted to the next longer wavelength dye (F-Dye #2, for example) excitation wavelength, which adds to the same wavelength energy also present in the solar flux. In effect the second dye (F-Dye #2) receives a double amount of energy in its excitation energy range which is emitted at a longer wavelength. However, a phosphor, laser or fluorescent dye emission is approximately equivalent to a single wavelength, so only a series of shifts to longer wavelengths of the phosphor or LEF-Dye emission energy is accomplished by a optically unseparated fluorescent dye cascade waveguide. The last fluorescent dye (longer wavelength) is the only fluorescent event that scatters the phosphor, laser or solar flux emissions into trapped modes within the waveguide. All the emission from the first dye F-Dye #3 is absorbed by the second dye F-Dye #2, allowing for fluorescent efficiency, because the second dye cannot distinguish between emission photons from the first dye that are in a trapped mode and the untrapped photons. Therefore the last fluorescent dye emissions can be the only scattering event that causes trapping of the incident radiation energy. However, by partitioning the waveguide with cladding layers into waveguide zones in which the fluorescent dyes are separated, the invention separates the shorter wavelength dye trapped photons from the next longer wavelength fluorescent dye, but allows the next dye in the cascade to still be excited by the untrapped emission photons from the first dye. This separation and protection of the trapped photons emitted by each fluorescent dye from being absorbed and rescatterd by another fluorescent dye, allows use of multiple fluorescent dyes to increase the amount of phosphor emissions trapped within the device.

The phosphor emission energy in the device [14] is trapped in six waveguide zones with three different wavelength spectrums. If a single dominate wavelength is desired, a diffuser ring (18), as shown in FIG. 2a, made of the waveguide core material with a outer circumferential layer of cladding material and containing F-Dye #2 and F-Dye #1, is placed at the end of the waveguide (14) or array (17) to convert the shorter wavelengths to the longer wavelength of the F-Dye #1. For markers to have good visibility, the final fluorescence emission should be under 610 nm to fall favorably within the human eye's spectral response spectrum.

Examples of material referred to in Table 1 are:
Phosphor #1 Hanovia Glo Pigment Series 1000 (zinc sulfide with double activators)
Phosphor #2
  (a) ZnZrO3 with neodymium activator
  (b) Zb+Zn2SiO4 with manganese activator*
  (c) CaS with antimony activator*
F-Dye #1
  (a) Thioindigo pigments CI Vat Red 1 and CI Vat Red 41
  (b) Heledon pink PR-109
  (c) Radiant R105,R106 and R-203-G
  (d) Rhodamine B
F-Dye #2
  (a) Perinone pigment CI Vat Orange 7
  (b) CI 753 Phodamin G
  (c) Fluorcscein
  (d) Radiant R-105, R-106 and R-203G
F-Dye #3
  (a) Terephthalic acid, 2, 5-dehydr. oxydiethylester
  (b) 12H-phthaloperin-12-1
  (c) Radiant R-105
  (d) Disazo CI 508 Dianil Blue G

* denotes information from *Fluorochemistry* by Jack De Ment, Chemical Publishing Company, Brooklyn, New York, 1945.

The phosphor material choice will depend on the luminescent fiber marker application and the required photophosphorescence emission characteristics desired. The phosphor will be one or a combination of halides, oxides, silicates, sulfides, sulphates and other compounds of barium, cadmium, calcium, magnesium, strontium, niobium and zinc with an activator of bismuth, copper, cerium, eruopium, lead, antimony, silver, samarium, manganese, uranium, yttrium, thulium, terbium and neodymium or combinations thereof. Many phosphors with photophosphorescent properties are commercially available. For example, Hanovia phosphorescent pigment P1000 will provide satisfactory photophosphorescence in the luminescent fiber marker according to this invention.

The phosphor layer (10) should be of sufficient depth and density to present a uniform phosphor surface to the excitation energy (13), but not so thick as to prevent internal emission photons (8) from escaping into the waveguide (11). In addition, the phosphor layer shields the fluorescent dyes in the inner waveguide from damage by incident ultraviolet.

One preferred embodiment, (1) shown in FIG. 1, is a 30 mil diameter marker using polycarbonate or polystyrene (n=1.59) with C.I. Vat Red 1, Heledon pink PR-109, Radiant R-203G, Xanthene derivative Eosine C.I. Vat Red 87 or C.I. Vat Red 41 added at the ratio of $10^{-3}$ to $10^{-5}$ weight of polycarbonate or polystyrene to provide fluorescence that absorbs light of about 550 nm wavelength and emits light of about 590 nm. The phosphor is a nontoxic zinc sulfide phosphorescent P-1000 sold by Hanovia with an emission spectrum centered near 550 nm. The cladding material (9) is a fluorinated polymer (n=1.40).

The preferred embodiment is formed by a combination of coextrusion, phosphor-resin composite powder coatings thermal, solvent and or ultraviolet cured, glass core-cladding preforms heat drawn into fibers and or cylinders, surface finishing, coating and fiber layering methods well known to and commercially available from those skilled in the manufacturing of optical fibers and composite sheet material.

Referring again to FIGS. 1a and 1b, the outer radius (4) is 15 mils, the cladding (9) is 1 mil, the outer phosphor layer radius (3) is 10 mils and the inner radius (2) is 8 mils. The ratio of phosphor area to waveguide area is pi * [10+8]/15 or approximately 3.75. The ratio of trapped energy to the initial scattered energy is 1-arcsin (1.40/1.59) or 0.119 and with a fluorescence efficiency of 0.85, a trapping effectiveness of approximately 0.10 is created. Therefore, the net area of phosphor surface adding emission photons to the waveguide flux is 0.375 D per unit of waveguide length. The multiplication of photon flux is 0.375 D*(length of waveguide) / (pi*(D)^2/4)*(2) or 0.75 L/pi (D) less transmission losses in the waveguide.

Referring to FIG. 2a, b and c, a single fiber marker (21) with a length (16) of 1.5 feet, will contain an active phosphor surface of 1.5*(12)*(3.75)*(0.30) or 2.025 square inches of phosphor surface. By placing the fiber marker (21) in an array (15) with a depth of four fibers (see FIG. 2b) and a radius (22) of 0.75 inches the active phosphor surface is approximately (2 pi)*(0.75+0.75−(4) (0.03))* (½)*(1/0.03)*(4)*(2.025) or 1170 square inches or over 8 square feet in a device (17) with a plain surface area of 18*1.5/144 or 0.19 square feet. The intensity of emission is 0.75*(18)/pi(0.030) or 143 times the intensity from the phosphor's surface. If a retro-reflector (19) is placed on one end [61] of the array marker (17) the light intensity is increased 50 to 60 percent at the other end [62], which is 220 times the source luminescence from the phosphor. If the embodiment is enlarged from 30 mils to a 60 mils diameter marker, the same array [17] will contain 9.17 square feet of active phosphor surface. The intensity of the emission at the array's ends [61, 62] will drop from 143 to 82 times the source phosphor luminescence.

This embodiment (17) when equipped with a retro-reflector disk (19) made of waveguide core material at end (61) and a diffuser disk (18) at end (62) with a parabolic reflector (20) fitted over the array's end (62) and diffuser (18) creates a light beam source. The reflector (20) can be formed from any light reflecting material, for example, polished aluminum. This device is a nonelectric alternate to a small battery powered hand held torch.

Figure 3:
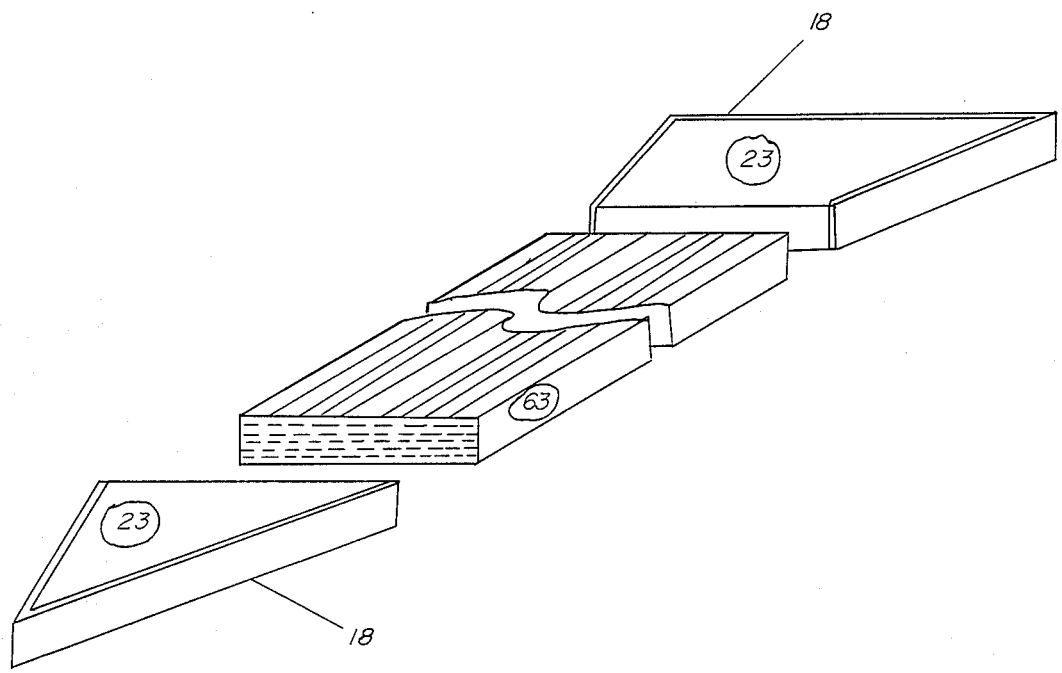
FIG. 3 is a perspective view of a directional marker.

This embodiment of the marker fiber array (17) can be used as a flat plate (63) as shown in FIG. 3 with the ends (23) shaped as arrow head with edge diffuser (bands (18) for a highly visible non-electrical directional marker. The ends (23) may be any shape required by the marker's purpose. The end (23) material can be optically clear to the trapped emissions (8, 31, 41, 51), contain fluorescence means to convert the trapped emissions to a single wavelength, and or reflective and refractive means to scatter the emissions as a diffuser.

Figure 4:
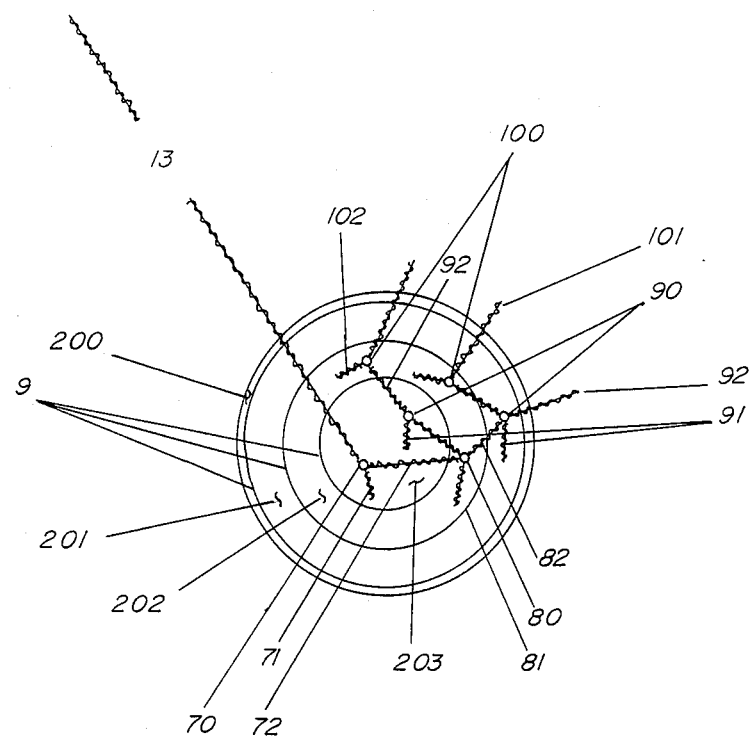
FIGS. 4 and 5 are views of an LEF-Dye detector and cross-section of the device configuration.

Referring now to FIG. 4, the device is configured to trap the scattered photons from a blue-green laser. Layer [200] is an outer protective polymer optically clear to the blue-green photon [13] and containing the fluorescent dyes [80] [90] and [100] to scatter by fluorescence other wavelength photons that may be present in the incident flux. The dyes in layer [200] minimize the trapping of energy other than from the laser or other desired incident energy in waveguides [201], [202] and [203]. The blue-green photons [13] enters the waveguide [203] which contains the fluorescent dye [70] F-Dye #2 [referred to as LEF-Due] and excites the dye [70] to emit photons [71] and [72] at a longer wavelength. [71] represents the fraction of F-Dye #2 fluorescence trapped in waveguide [203]. The untrapped emissions [72] of dye [70] leave waveguide [203] through the cladding [9] and enter waveguide [202] and excite the fluorescent dye F-Dye #1, [80] to fluorescence [81] and [82]. [81] represents the fraction of F-Dye #1 fluorescence trapped in waveguide [202] interface at an angle greater than the critical angle of incident for total internal reflection as defined by Snell's law. The untrapped fluorescence [82] passes through the cladding layer [9] into either waveguide [201] or [203] and excites a longer wavelength fluorescent dye [90]. The fluorescent dye [90] can share the inner waveguide [203] with the fluorescent dye [70] because the emission wavelength from fluorescent dye [70] is shorter (therefore, trapped photons [71] are not rescattered by [90] and lost) than the excitation wavelength of fluorescent dye [90]. The cycle can again be repeated with an even longer wavelength fluorescent dye [100] in waveguide [202]. Dye [100] excitation spectrum must be outside of Dye [80] emission spectrum to prevent rescattering in waveguide [202] of trapped emission photons from the shorter wavelength fluorescent dye [80] by the longer wavelength fluorescent dye [100].

The blue-green photon flux initiates a fluorescent cascade in waveguide [203], FIG. 4, that starts with fluorescent dye [70], then fluorescent dye [80] in the next coaxial and co-centered waveguide [202], then fluorescent dye [90] in waveguides [203] and [201], then fluorescent dye [100] in waveguide [202] in which up to thirty percent of the blue-green flux is trapped in the waveguides [201], [202] and [203] by fluorescent scatter. The trapped energy has four different wavelengths with the longest in the deep red or near infrared. Again, a diffuser [18] FIG. 2, can be used to convert the trapped energy into the longer wavelength of the last fluorescent dye [100]. Four dyes are described, but fewer or more dyes can be used. The key to high trapping efficiencies is to prevent the rescattering of the photons that each fluorescent dye [70, 80, 90, 100] has scattered into angles of incident allowing trapping in the waveguide cores.

Figure 5:
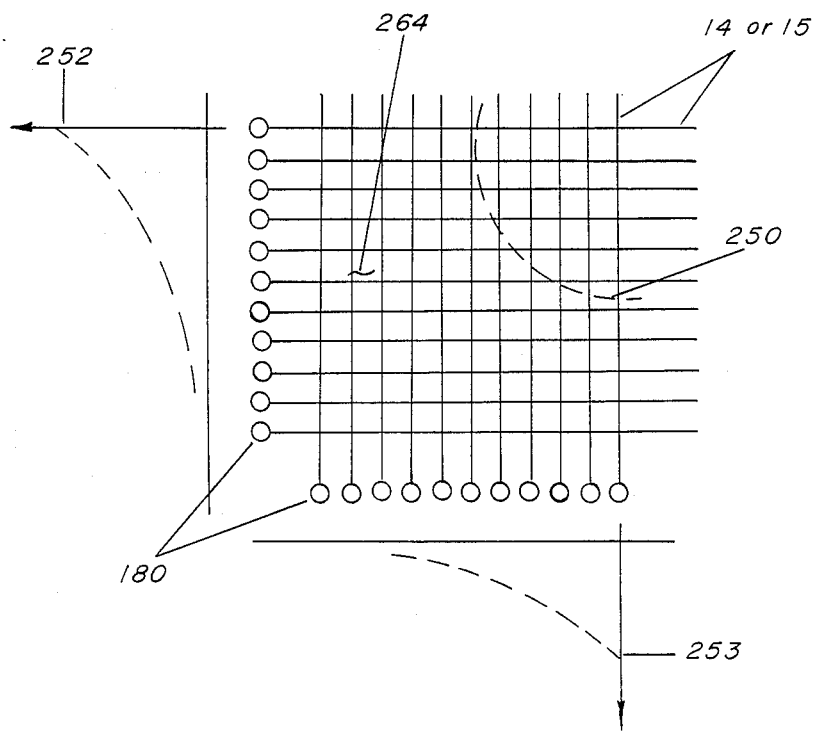

As shown in FIG. 5, monocrystal silicon, gallium-arsenic, or other photoelectric cells can be optically coupled to the end of each fiber [14] or array [15] to generate a current or voltage rise [252] and [253] proportional to the change in the blue-green laser photon flux incident on the device. A cross directional array [264] of fibers [14] using individual photodetectors [180] can be used to create a proximity sensor for a laser flux [250] field by measuring the intensity of the photodetectors output [252] and [253] and direction along each axis of the fiber array of the rate of change the photodetector output is traveling. A two dimension array [264] is shown, but a three dimension array can be formed with the addition of a third set of fibers [14] and photodetectors [180].

While several different embodiments of the invention have been described in detail, it is to be understood that various modifications and adaptations of the invention will be obvious and apparent to those skilled in the art and it is intended that such obvious and apparent modifications and adaptations be included in the spirit and scope of the invention as set forth in the appended claims.

I claim:

1. A linear coaxial lens comprising, an elongated thin cylindrical phosphorescent layer and a pair of colinear and coaxial optical waveguides sandwiching said thin cylindrical phosphorescent layer therebetween so that light impinging on said cylindrical phosphorescent layer along the length thereof is induced to store radiation energy in said light and emit radiation energy of a different wavelength from the light impinging on said cylindrical phosphorescent layer into both of said optical waveguides, each of said optical waveguides having a fluorescent material dispersed therein for absorbing the emitted radiation from said phosphorescent layer and reemitting the absorbed radiation to effect an internal scatter of radiation in each of said waveguides to permit trapping within said waveguides and at least one of the ends of said pair of colinear and coaxial waveguides being adapted to emit said light of a different wavelength.

2. The linear coaxial lens defined in claim 1 in which said cylindrical phosphorescent layer is comprised of a mixture of phosphors, each phosphor being excited by a different range of wave lengths of said light impinging on said cylindrical phosphorescent layer and each said waveguide including several fluorescent materials, each fluorescent material being adapted to absorb and emit light of a different wavelength, respectively.

3. A luminescent marker comprising in combination a plurality of linear coaxial lenses as defined in claim 1, means arranging said ends of said plurality of coaxial optical wave guides in a contiguous relation such that the light is emitted in a predetermined pattern.

4. A luminescent marker as defined in claim 3, wherein each of said pair of colinear and coaxial optical waveguides has light emitting ends which are oriented to emit light in the same direction and diffuser means positioned to receive and diffuse light emitted from said ends.

5. A luminescent marker as defined in claim 4, wherein said diffuser means is in the shape of an arrowhead so as to present light from said marker as a passive illuminated directional sign.

6. In combination, a plurality of linear coaxial lenses as defined in claim 1, and means maintaining said plurality of linear coaxial lenses in a mechanically coherent assembly having a pair of spaced-apart ends.

7. The combination defined in claim 6, wherein at least one of said spaced-apart ends has a predetermined shape.

8. The combination defined in claim 6, wherein at least one of said pair of spaced-apart ends contains fluorescence means to convert trapped emissions to a single wave length.

9. The combination defined in claim 6, including a reflector means at one of said ends.

10. The combination defined in claim 6, including a retro-reflector at one of said ends to reflect all light emitted from said one of said ends back into said optical wave guide for emission at the opposite end thereof.

11. The combination defined in claim 6, including a refractive member for receiving light from said optical wave guides and scattering said emissions to the ambient surroundings.

12. The combination defined in claim 6, wherein said mechanically coherent assembly is a flat plate.

13. The combination defined in claim 6, wherein a retro-reflector is positioned at one of said pair of spaced apart ends and a parabolic reflector is positioned at the other of said ends.

14. A non-electric hand-held torch comprising the combination defined in claim 6, including a reflector at one of said spaced apart ends, and a diffuser at the other of said ends.

15. The linear coaxial lens defined in claim 1, wherein at least the center one of said optical waveguides is comprised of a material selected from the group consisting of polycarbonate and polystyrene, said fluorescent material is selected from the group consisting of Heledon pink PR-109, RH-101, Xanthene derivative Eosine (C.1 acid Red-87) and C.1 Vat-Red added at a rate of about $10^{-3}$ to about $10^{-5}$ by weight of a said polycarbonate or polystyrene at the surface of said center one of said optical waveguides.

16. In combination, a plurality of linear coaxial lenses as defined in claim 15, and means maintaining said plurality of linear coaxial lenses in a mechanically coherent assembly.

17. The combination defined in claim 16, wherein at least one of said spaced-apart ends has a predetermined shape.

18. The combination defined in claim 16, wherein each said linear coaxial lens has a pair of spaced apart ends and at least one of said pair of spaced apart ends contains fluorescence means to convert trapped emissions to a single wavelength.

19. The combination defined in claim 16, including a reflector means at one of said ends.

20. The combination defined in claim 16, including a retro-reflector at one of said ends to reflect all light emitted from said one of said ends back into said optical wave guides for emission at the opposite end thereof.

21. The combination defined in claim 16, including a refractive member for receiving light from said optical wave guides and scattering said emissions to the ambient surroundings.

22. The combination defined in claim 16, wherein said mechanically coherent assembly is a flat plate.

23. The combination defined in claim 16, wherein said linear coaxial lens has a pair of spaced apart ends and a retro-reflector is positioned at one of said pair of spaced apart ends and a parabolic reflector is positioned at the other of said spaced apart ends.

24. A non-electric hand-held torch comprising the combination defined in claim 16, wherein said linear coaxial lens has a pair of spaced apart ends including a reflector at one of said spaced apart ends, and a diffuser at the other of said ends.

25. The linear coaxial lens defined in claim 1 in which said pair of colinear and coaxial optical waveguides are partitioned to form several colinear and coaxial optical waveguides, each said waveguide having several fluorescent materials dispersed therein for absorbing different ranges of wavelengths of light impinging on said waveguide and reemitting the absorbed radiation at a longer wavelength to effect an internal scatter within said waveguide of each range of wavelengths of light impinging on said waveguide to permit trapping within the waveguide a fraction of each impinging wavelengths range of light.

26. The linear coaxial lens defined in claim 1 in which said cylindrical phosphorescent layer is comprised of a fluorescent material, the fluorescent material being excited by specified wavelengths of light impinging on said cylindrical fluorescent layer and each said optical waveguide having a fluorescent material dispersed therein for absorbing the emitted radiation from said cylindrical fluorescent layer and reemitting the absorbed radiation in each of said waveguides to permit trapping of a fraction of the emitted radiation within waveguide and at least one of the ends of said pair of colinear and coaxial waveguides being adapted to emit said light of a different wavelength.

27. An electromagnetic emissions detector comprising in combination, a plurality of linear coaxial lenses as defined in claim 26, means arranging said ends of plurality of coaxial optical waveguides in a contiguous relation such that the light is emitted in a predetermined pattern.

28. An electromagnetic emissions detector as defined in claim 27 wherein each of said pair of colinear and coaxial optical waveguides has light emitting ends which are oriented to emit light in the same direction and photoelectric means positioned to receive and measure light emitted from said ends.

29. The linear coaxial lens defined in claim 25 wherein each fluorescent material is excited by a different range of electromagnetic radiation wavelengths impinging on said waveguide and with each fluorescent material emitting electromagnetic radiation in a wavelength range different from the absorption wavelength range of the other fluorescent materials contained within said waveguide.

30. A device for multiplying the phosphor luminance output intensity of a photoluminescent phosphor, comprising, a first cylindrical optical waveguide having an external cylindrical surface, a thin wall cylinder of photoluminescent phosphor formed on said external cylindrical surface, and a second cylindrical waveguide formed on said thin wall cylinder of photoluminescent phosphor, and each said waveguide including a fluorescent material therein.

31. The device defined in claim 30 wherein said second cylindrical waveguide is optically clear to pass incident photon energy to said photoluminescent phosphor, said thin walled photoluminescent phosphor cylinder having a thickness such that incident photon energy passing transversely through said second waveguide excites the entire thickness of said photoluminescent phosphor cylinder to emit its characteristic photon energy and each optical waveguide receiving and converting said characteristic photon energy to a direction parallel to the axis of said cylinder of photoluminescent phosphor.

32. An incident radiant energy concentration device comprising, a first optical waveguide element having a first edge and a first length dimension, and being a cylindrical optical waveguide, a thin cylindrical photoluminescent phosphor layer coaxially located within said first optical waveguide, a second optical waveguide coaxially located within said thin cylindrical photoluminescent layer and having a second length dimension and a second edge, each said optical waveguide being adapted to effect capture of energy in guided modes of said first and second waveguides and by cumulative propagation of trapped radiation energy emitted by said photoluminescent phosphor layer along each said waveguide length dimension and effect a concentration of radiation energy at said first and second edges.

33. An incident radiant energy concentration device as defined in claim 32 wherein each said wave guide is cirularly cylindrical and includes fluorescence means.

34. A device for concentrating radiant energy comprising, a plurality of first optical waveguide elements, each of said first waveguide elements having a body portion extending between a pair of ends, a first external surface on said body portion exposed to receive incident radiation between the end of said body portion and a second external surface exposed to emit radiation at at least one of said ends of said body portion, a corresponding plurality less one of thin-walled photoluminescent phosphor cylinders located colinearly and coaxially with said optical waveguide elements with individual ones of said photoluminescent phosphor cylinders being contained within individual ones of said optical waveguide elements, a corresponding plurality of second optical waveguide elements with individual ones of said second optical waveguide elements being contained within said photoluminescent phosphor cylinders, each said optical waveguide having means for internally changing the direction of travel of at least a portion of radiant energy emitted by said photoluminescent phosphor cylinders to each optical waveguide associated therewith to effect capture of a fraction of the radiant energy emitted by said phosphor cylinders in guided modes of said optical waveguides and by cumulative propagation of trapped radiation energy along said waveguide body portion to thereby effect a concentration of radiation energy and emission at at least one of said ends of said optical waveguide.

35. The device defined in claim 34 including a mirror at one of said pair of ends of all of said optical wave guides.

36. The device defined in claim 34 including a ring diffuser coupled to the other one of said pair of ends of said optical wave guides.

37. A device for multiplying the phosphor luminance output intensity of a photoluminescent phosphor, comprising,
   a first optical waveguide having an external surface,
   a thin layer of photoluminescent phosphor formed on said external surface,
   a second waveguide formed on said thin layer of photoluminescent phosphor, and each said waveguide including a fluorescent material therein, each said fluorescent material being responsive at least in part to radiation from said photoluminescent layer.

38. The device defined in claim 37 wherein the fluorescent material in each said waveguide have different radiation excitation wavelengths.

39. The device defined in claim 38 wherein the fluorescent material in each said waveguide have different radiation excitation wavelengths and different radiation emission wavelengths.

40. The device defined in claim 37 wherein the fluorescent material in each said waveguide have different radiation emission wavelengths.

41. A method of concentrating radiant energy comprising,
   providing a first cylindrical optical waveguide having a pair of spaced apart ends, a first external surface exposed to receive incident radiation, said first external surface being between said spaced apart ends, a second external surface exposed to emit radiation at one of said spaced apart ends, and a fluorescent material dispersed therein,
   providing a thin-walled photoluminescent phosphor cylinder coaxially within said first cylindrical waveguide,
   providing a second cylindrical optical waveguide coaxially located within said photoluminescent phosphor cylinder having a third external surface for receiving radiant energy from said photoluminescent phosphor cylinder, a fourth external surface to emit radiation energy and a fluorescent material dispersed therein,
   exposing said first external surface to incident radiation,
   converting the direction of at least a portion of radiant energy emitted by said photoluminescent phosphor cylinder within each of said optical waveguides by action of said fluorescent material, respectively, to effect an internal capture of a fraction of the incident radiant energy to guided modes in each of said optical waveguides, respectively, and by cumulative propagation of trapped radiation energy along each said optical waveguide to effect a concentration of radiation energy and emission at said second and fourth external surfaces of said optical waveguides.

42. The method of concentrating radiant energy as defined in claim 41 in which there is provided at least one further of said first and second optical waveguides arrayed in such a way relative to each other that incident radiant energy passing through the first said optical waveguide constitutes the incident radiation of said further optical waveguide to which the first external surface thereof is exposed, and converting the direction of at least a portion of said incident radiation in said at least one further of said first end second optical waveguides to effect capture of a further portion of the incident radiation energy in guide modes of said optical waveguide by cumulative propagation of trapped radiation energy along said further optical waveguide to effect concentration of radiation energy and emission at at least one end of said further optical waveguide.

43. A method of multiplying the phosphor luminance output intensity of photoluminescent phosphor comprising,
   sandwiching a thin photoluminescent phosphor layer between first and second optical waveguides,
   at least one of said optical waveguides passing incident photon energy to the outer surface of said photoluminescent phosphor to excite same to emission of its characteristic photon energy and both said optical waveguides receiving and by fluorescent reemission converting the direction of phosphor emitted characteristic photon energy to a direction parallel to the axis of said thin phosphor layer.

* * * * *